(12) United States Patent
Carpenter et al.

(10) Patent No.: US 8,933,150 B2
(45) Date of Patent: Jan. 13, 2015

(54) GRENITE: A COMPOSITE MATERIAL EXHIBITING HIGH IMPACT, SCRATCH AND STAIN RESISTANCE

(75) Inventors: John G. Carpenter, Camano Island, WA (US); Richard E. Johnson, Rancho Palos Verdes, CA (US)

(73) Assignee: Grenite Sustainable Solutions, LLC, Metuchen, NJ (US)

( * ) Notice: Subject to any disclaimer, the term of this patent is extended or adjusted under 35 U.S.C. 154(b) by 0 days.

(21) Appl. No.: 11/347,962

(22) Filed: Feb. 6, 2006

(65) Prior Publication Data

US 2007/0185252 A1    Aug. 9, 2007

(51) Int. Cl.

| | |
|---|---|
| *A01G 9/24* | (2006.01) |
| *B01F 17/00* | (2006.01) |
| *B29C 43/00* | (2006.01) |
| *B29C 47/76* | (2006.01) |
| *B29D 24/00* | (2006.01) |
| *B60C 1/00* | (2006.01) |
| *C04B 26/06* | (2006.01) |
| *C08G 18/28* | (2006.01) |
| *C08G 59/50* | (2006.01) |
| *C08G 63/60* | (2006.01) |
| *C08G 67/02* | (2006.01) |
| *C08K 3/00* | (2006.01) |
| *C08K 3/10* | (2006.01) |
| *C08K 3/18* | (2006.01) |
| *C08K 3/22* | (2006.01) |
| *C08K 3/34* | (2006.01) |
| *C08K 9/00* | (2006.01) |
| *C08L 31/00* | (2006.01) |
| *C08L 33/00* | (2006.01) |
| *C08L 63/00* | (2006.01) |
| *C08L 67/00* | (2006.01) |
| *C08L 73/00* | (2006.01) |
| *C08L 75/00* | (2006.01) |
| *C08L 79/00* | (2006.01) |
| *C09D 5/02* | (2006.01) |
| *H01B 1/12* | (2006.01) |
| *H01M 8/12* | (2006.01) |
| *C08K 9/04* | (2006.01) |

(52) U.S. Cl.
CPC .... *C08K 3/34* (2013.01); *C08K 9/04* (2013.01)
USPC .......... 523/200; 264/102; 264/500; 523/400; 524/401; 524/430; 524/434; 524/435; 524/436; 524/437; 524/492; 524/556; 524/590; 524/599; 524/601; 524/612

(58) Field of Classification Search
USPC .......... 264/102, 500; 523/200, 400; 524/401, 524/430, 434, 435, 436, 437, 492, 556, 590, 524/599, 601, 612
See application file for complete search history.

(56) References Cited

U.S. PATENT DOCUMENTS

| | | | | |
|---|---|---|---|---|
| 3,328,231 | A * | 6/1967 | Sergovic | 428/451 |
| 4,946,359 | A * | 8/1990 | Christen | 425/222 |
| 7,037,865 | B1 * | 5/2006 | Kimberly | 442/181 |

* cited by examiner

*Primary Examiner* — Patrick Niland
(74) *Attorney, Agent, or Firm* — David L. Hoffman; Hoffman Patent Group

(57) ABSTRACT

This invention describes a composite molded material consisting of granular ceramic or ceramic coated material and liquid epoxy or urethane resin or vinyl ester resin or polyester resin or mixtures thereof in various ratios by weight and the processes by which the invention is produced. This invention results in a composite material of two or more dissimilar materials which improves the characteristic properties, such as wear, stain and abrasion resistance, oxidation resistance, corrosion resistance, heat resistance, electrical and thermal conductivity, and mechanical strength for which a monolithic material is not satisfactory.

15 Claims, No Drawings

GRENITE: A COMPOSITE MATERIAL EXHIBITING HIGH IMPACT, SCRATCH AND STAIN RESISTANCE

BACKGROUND OF THE INVENTION

This invention is the result of market driven need for a solid surface material that combines aesthetic properties, including specified/custom colors and forms, with long lasting wear resistance. Such a material would provide consistent beauty while resisting the abrasive and other destructive forces from daily use in high traffic applications and require low levels of maintenance. Such a material would find use in a wide range of applications.

SUMMARY OF THE INVENTION

It is an object of the present invention to provide a composite material which permits the dispersed components to fully exhibit their characteristic properties without lowering their mechanical properties. It is another object of the present invention to provide a process for producing said composite material. It is a further object of this invention to define applications for which this product can be employed.

DESCRIPTION OF THE INVENTION

The first aspect of the present invention resides in a composite material which comprises a matrix and dispersed components which form a discontinuous three-dimensional network structure in the matrix.

The composite material of the present invention permits the dispersed components to fully exhibit their characteristic properties without lowering the mechanical properties of the matrix.

The composite material is formed by the combination of ceramic or ceramic coated particles which comprise greater than fifty percent of the weight of the end product with a liquid resin which comprises less than fifty percent by weight of the end product. The present invention envisions particle ratios that could exceed eight-five percent by weight. Higher particle weight ratios are shown to facilitate formation of a continuous three-dimensional matrix.

A probable reason for the composite material of the present invention to produce its outstanding effect is that the dispersed components forming the discontinuous three-dimensional network structure in the matrix produces a synergistic effect due to reinforcement by the dispersed components themselves (dispersed phase are particles in this case) and reinforcement by the skeletal structure of the dispersed components.

The dispersed components produce different effects depending on its purpose. The dispersed components for reinforcement serve to strengthen the material and form a discontinuous three-dimensional skeletal structure, which prevents the formation of pores which leads to breakage. The skeletal structure also serves to resist a high stress as the dispersed components prevent the dislocation and cracking between the adjoining networks. This improves the strength and toughness of the composite material. If the dispersed components are heat-resistance, they form a heat-resistant skeletal structure which prevents the matrix from softening and deformation. Moreover, the dispersed components serve to prevent the inter-granular slipping and dislocation due to the softening of the crystal interface. This improves the instantaneous breaking strength and creep properties at high temperatures. Unlike the continuous phase, the discontinuously dispersed components prevent cracks from propagating through the dispersed components or along the interface between the matrix and the dispersed components. Moreover, the dispersed particles provide an unexpectedly hard surface which yield excellent stain, scratch and corrosion resistance.

If the dispersed components are intended for functional properties, this invention yields a denser composite material than dispersed components of a continuous network structure. This prevents the formation of pores (leading to breakage) and imparts the desired functional properties without sacrificing strength.

For reasons mentioned above, the composite material of the present invention permits the dispersed components to fully exhibit their characteristic properties without lowering the mechanical properties of the matrix.

The second aspect of the present invention resides in a process for producing a composite material which is composed of a matrix and dispersed components which form a discontinuous three-dimensional network structure in the matrix, said process comprising the steps of;

1. Preparing a raw material powder such that ceramic or ceramic coated granules of desired shape for the matrix are discontinuously covered with liquid resin, either in situ, or outside the mold cavity.

2. The combination of granular material and resin is then introduced into the mold cavity for final cure and formation of the molded article.

An equally effective process is also claimed wherein the admixture of dispersed components, such as ceramic or ceramic coated granules, color chips, decorative additives and other solid materials, are placed in the mold cavity and the catalyzed epoxy or urethane resin or mixture thereof is vacuum infused throughout the granular material providing the three-dimensional matrix.

The process of the present invention yields easily a composite material which permits the dispersed components to fully exhibit their characteristic properties without lowering the mechanical properties of the matrix.

Among the applications for this invention are commercial and private aircraft work surfaces, table tops, counter tops, lavatory basins, sinks and shower enclosures, aircraft galley horizontal and vertical work surfaces and those subject to abrasion and damage, retail cabinetry, mannequin bases, low maintenance molding for construction applications, bar tops, retail store fixtures including counter tops, shelves, tables, table bases, decorative store and public use fixtures/ornaments, seating, planters/flower pots and waste (trash) and recycle containers. Other envisioned applications include floor and wall tiles, decorative wall fixtures, landscape decorative items, decorative column covers and work table tops.

The invention claimed is:

1. A composite molded material, comprising:
   a liquid resin for pouring into a mold and for curing into a rigid form, said liquid resin taken from the following: epoxy, urethane, vinyl ester and polyesters; and,
   granular particles of varying sizes, and having a grain shape, and wherein the granular particles are made of ceramic or ceramic-coated particles, wherein the granular particles are discontinuously covered with said liquid resin, the amount of said granular particles dispersed in said liquid resin is eighty five percent by weight of the composite molded material, and
   wherein the liquid resin discontinuously covers the granular particles, the liquid resin being cured with the particles discontinuously disposed therein and providing a continuous three dimensional matrix of the granular particles.

2. The composite molded material of claim 1, wherein the material consists essentially of the granular particles and the liquid resin.

3. A method for manufacturing a composite molded article comprising:
   (i) preparing a raw material powder of ceramic or ceramic-coated granules;
   (ii) selecting a liquid resin from the following group: epoxy, urethane, vinyl ester and polyester resins;
   (iii) discontinuously covering the granules with the liquid resin; and
   (iv) curing the granules and liquid resin in a mold to form the article, wherein the granules are greater than fifty percent by weight of the article and the liquid resin is less than fifty percent by weight of the article.

4. The method of claim 3, wherein the granules are discontinuously covered with the liquid resin while in the mold.

5. The method of claim 3, wherein the method forms the article so as to consist essentially of the liquid resin and granules.

6. The method of claim 3, wherein the granules are selected so as to vary in size and have a grain shape.

7. The method of claim 3, wherein the granules are eighty five percent by weight of the article.

8. The method of claim 6, wherein the granules are eighty five percent by weight, and the liquid resin is fifteen percent by weight of the article.

9. The composite molded material of claim 1 wherein the particles are disposed in a skeletal fashion.

10. The method of claim 3, wherein the granules are discontinuously covered with resin and cured so as to be disposed in a skeletal fashion.

11. The method of claim 10, wherein the granules are selected so as to vary in size and have a grain shape.

12. The method of claim 11, wherein in the granules are eighty five percent by weight of the article.

13. A composite molded material, comprising:
   a liquid resin for pouring into a mold and for curing into a rigid form, said liquid resin taken from the following: epoxy, urethane, vinyl ester and polyesters; and,
   granular particles of varying sizes consisting of grains, and wherein the granular particles are made of ceramic or ceramic-coated particles, wherein the granular particles are covered with said liquid resin, the amount of said granular particles dispersed in said liquid resin is eighty five percent by weight of the composite molded material, and
   wherein the granular particles form a continuous three dimensional matrix of the granular particles, the liquid resin being cured with the particles disposed therein in the continuous three dimensional matrix.

14. The composite molded material of claim 1, wherein the particles are in a skeletal structure.

15. The method of claim 3, wherein the granules are discontinuously covered with resin and cured and in a skeletal structure.

* * * * *